(12) United States Patent
Ooiwa

(10) Patent No.: US 7,143,506 B2
(45) Date of Patent: Dec. 5, 2006

(54) ROTARY ELECTRIC MACHINE AND METHOD FOR MANUFACTURING THE SAME

(75) Inventor: Tooru Ooiwa, Toyota (JP)

(73) Assignee: Denso Corporation, Kariya (JP)

( * ) Notice: Subject to any disclaimer, the term of this patent is extended or adjusted under 35 U.S.C. 154(b) by 473 days.

(21) Appl. No.: 10/693,522

(22) Filed: Oct. 27, 2003

(65) Prior Publication Data

US 2004/0083597 A1    May 6, 2004

Related U.S. Application Data

(62) Division of application No. 09/960,735, filed on Sep. 24, 2001, now Pat. No. 6,727,625.

(30) Foreign Application Priority Data

Sep. 25, 2000 (JP) .............................. 2000-290363

(51) Int. Cl.
 *H02K 15/04* (2006.01)
 *H02K 15/06* (2006.01)
 *H02K 15/085* (2006.01)
 *H02K 3/04* (2006.01)

(52) U.S. Cl. ............... 29/606; 29/596; 29/598; 310/184; 310/201; 310/207; 310/218; 310/259

(58) Field of Classification Search ............ 29/596, 29/598, 605, 606; 310/179, 180, 184, 201, 310/207, 218, 259

See application file for complete search history.

(56) References Cited

U.S. PATENT DOCUMENTS

| | | | | |
|---|---|---|---|---|
| 2,399,931 A | | 5/1946 | Lamborn | 310/197 |
| 2,759,116 A | * | 8/1956 | Glass | 310/171 |
| 3,166,104 A | * | 1/1965 | Foley, Jr. et al. | 140/92.2 |
| 3,441,761 A | * | 4/1969 | Burke et al. | 310/154.04 |
| 4,102,040 A | | 7/1978 | Rich | 29/598 |
| 4,307,311 A | | 12/1981 | Grozinger | 310/179 |
| 4,351,102 A | | 9/1982 | Grozinger et al. | 29/596 |
| 4,402,129 A | | 9/1983 | Kreuzer et al. | 29/596 |
| 4,449,288 A | * | 5/1984 | Disclaire et al. | 29/596 |
| 4,864,715 A | * | 9/1989 | Sadier | 29/596 |
| 5,197,180 A | * | 3/1993 | Mihalko | 29/596 |
| 5,592,731 A | * | 1/1997 | Huang et al. | 29/596 |
| 5,886,444 A | | 3/1999 | Enomoto et al. | 310/208 |
| 5,998,903 A | | 12/1999 | Umeda et al. | 310/179 |
| 6,049,154 A | | 4/2000 | Asao et al. | 310/201 |
| 6,885,127 B1 | * | 4/2005 | Higashino et al. | 310/254 |

FOREIGN PATENT DOCUMENTS

| | | |
|---|---|---|
| EP | 0 818 874 A1 | 1/1998 |
| JP | 54-66406 | 5/1979 |

* cited by examiner

*Primary Examiner*—Peter Vo
*Assistant Examiner*—Livius Radu Cazan
(74) *Attorney, Agent, or Firm*—Oliff & Berridge PLC

(57) ABSTRACT

A method for manufacturing rotary electric machine that has a stator winding to provide a stator winding that has a plurality of conductors wound one over another. The conductors are wound with left and right ends. Therefore, the stator winding on the stator core has an overlapped joined portion.

9 Claims, 11 Drawing Sheets

| | 1 | 2 | 3 | 4 | 5 | 6 | 7 | 8 | 9 | 10 | 11 | 12 |
|---|---|---|---|---|---|---|---|---|---|---|---|---|
| Z1 | SN1 | D1 | SG4 | R1 | SN1 | D1 | SG4 | R1 | SN1 | D1 | SG4 | R1 |
| X1 | SN2 | D2 | SG5 | R2 | SN2 | D2 | SG5 | R2 | SN2 | D2 | SG5 | R2 |
| Y1 | SN3 | D3 | SG6 | R3 | SN3 | D3 | SG6 | R3 | SN3 | D3 | SG6 | R3 |
| Z2 | SN4 | D4 | SG7 | R4 | SN4 | D4 | SG7 | R4 | SN4 | D4 | SG7 | R4 |
| X2 | SN5 | D5 | SG8 | R5 | SN5 | D5 | SG8 | R5 | SN5 | D5 | SG8 | R5 |
| Y2 | SN6 | D6 | SG9 | R6 | SN6 | D6 | SG9 | R6 | SN6 | D6 | SG9 | R6 |

| | 13 | 14 | 15 | 16 | 17 | 18 | 19 | 20 | 21 | 22 | 23 | 24 |
|---|---|---|---|---|---|---|---|---|---|---|---|---|
| Z1 | SN1 | D1 | SG4 | R4 | SN7 | D7 | SG10 | R7 | SN7 | D7 | SG10 | R7 |
| X1 | SN2 | D2 | SG5 | R5 | SN8 | D8 | SG11 | R8 | SN8 | D8 | SG11 | R8 |
| Y1 | SN3 | D3 | SG6 | R6 | SN9 | D9 | SG12 | R9 | SN9 | D9 | SG12 | R9 |
| Z2 | SN4 | D4 | SG7 | R7 | SN10 | D10 | SG13 | R10 | SN10 | D10 | SG13 | R10 |
| X2 | SN5 | D5 | SG8 | R8 | SN11 | D11 | SG14 | R11 | SN11 | D11 | SG14 | R11 |
| Y2 | SN6 | D6 | SG9 | R9 | SN12 | D12 | SG15 | R12 | SN12 | D12 | SG15 | R12 |

| R28 | SN31 | D31 | SG34 | R31 | SN31 | D31 | SG34 |
|---|---|---|---|---|---|---|---|
| R29 | SN32 | D32 | SG35 | R32 | SN32 | D32 | SG35 |
| R30 | SN33 | D33 | SG36 | R33 | SN33 | D33 | SG36 |
| R31 | SN34 | D34 | SG1 | R34 | SN34 | D34 | SG1 |
| R32 | SN35 | D35 | SG2 | R35 | SN35 | D35 | SG2 |
| R33 | SN36 | D36 | SG3 | R36 | SN36 | D36 | SG3 |
| R31 | SN31 | D31 | SG34 | R31 | SN31 | D31 | SG34 |
| R32 | SN32 | D32 | SG35 | R32 | SN32 | D32 | SG35 |
| R33 | SN33 | D33 | SG36 | R33 | SN33 | D33 | SG36 |
| R34 | SN34 | D34 | SG1 | R34 | SN34 | D34 | SG1 |
| R35 | SN35 | D35 | SG2 | R35 | SN35 | D35 | SG2 |
| R36 | SN36 | D36 | SG3 | R36 | SN36 | D36 | SG3 |

ROTARY ELECTRIC MACHINE AND METHOD FOR MANUFACTURING THE SAME

This is a Division of Application Ser. No. 09/960,735 filed Sep. 24, 2001 now U.S. Pat. No. 6,727,625. The entire disclosure of the prior applications are hereby incorporated by reference herein in their entirety.

CROSS REFERENCE TO RELATED APPLICATION

This application is based on Japanese Patent Application No. 2000-290363 filed on Sep. 25, 2000, the contents of which are incorporated herein by reference.

BACKGROUND OF THE INVENTION

1. Field of the Invention:

The present invention relates to a rotary electric machine and a method for manufacturing the same.

2. Description of Related Art:

JP-A-54-66406 discloses an AC rotary electric machine that has a plurality of coils. The coils are inserted into slots in orderly manner to provide short coil ends by preventing crossings of the coil ends. However, this arrangement forms larger space in the slots to prevent the crossings of the coil ends.

JP-B-2927288 discloses an alternator for vehicle as a rotary electric machine, that has a plurality of segments and a plurality of joining portions between the segments. In this arrangement, a space factor of a stator winding in a slot can be increased. However, it is necessary to handle a lot of segments and to accomplish a complex assembling process.

JP-A-11-299153 discloses an alternator for vehicle that provides uniformly arranged coil ends. However, it is not easy to form all coil ends in a substantially identical manner.

SUMMARY OF THE INVENTION

One aspect of the present invention addresses these drawbacks by providing an improved arrangement of a rotary electric machine.

According to a first embodiment of the present invention, a rotary electric machine has a rotor and a stator. The stator has a stator core with a plurality of slots and a stator winding. The slots include a plurality of regular slots and a plurality of irregular slots. The stator winding has a plurality of in-slot portions accommodated in the slots and coil ends. The in-slot portions and the coil ends are arranged to provide a discontinuity of the stator winding at a region where the irregular slots are located.

Since the stator winding has a discontinuity, the stator winding may wound easily. In this arrangement, it is possible to improve a cross-sectional ratio of the conductors to the slot. Furthermore, it is possible to improve productivity by reducing complex manufacturing processes.

The stator winding may be assembled by winding the conductors one over another. The irregular slots may be located side by side. The stator winding may have a plurality of conductors for providing the in-slot portions. The stator winding may have no conductor cross over a region where the irregular slots are located. The conductors may be wound one over another.

BRIEF DESCRIPTION OF THE DRAWINGS

These and other features and advantages of the present invention will be appreciated, as well as methods of operation and the function of the related parts, from a study of the following detailed description and the drawings, all of which form a part of this application. In the drawings:

FIG. 5 is a winding chart of the windings on the stator core showing a winding order of the windings according to the first embodiment of the present invention;

FIG. 11 is a winding chart of the windings on the stator core showing a winding order of the windings according to the second embodiment of the present invention;

DETAILED DESCRIPTION OF PREFERRED EMBODIMENTS

First Embodiment

An alternator for a vehicle according to a first embodiment of the present invention is described with reference to the drawings.

Figure 1:
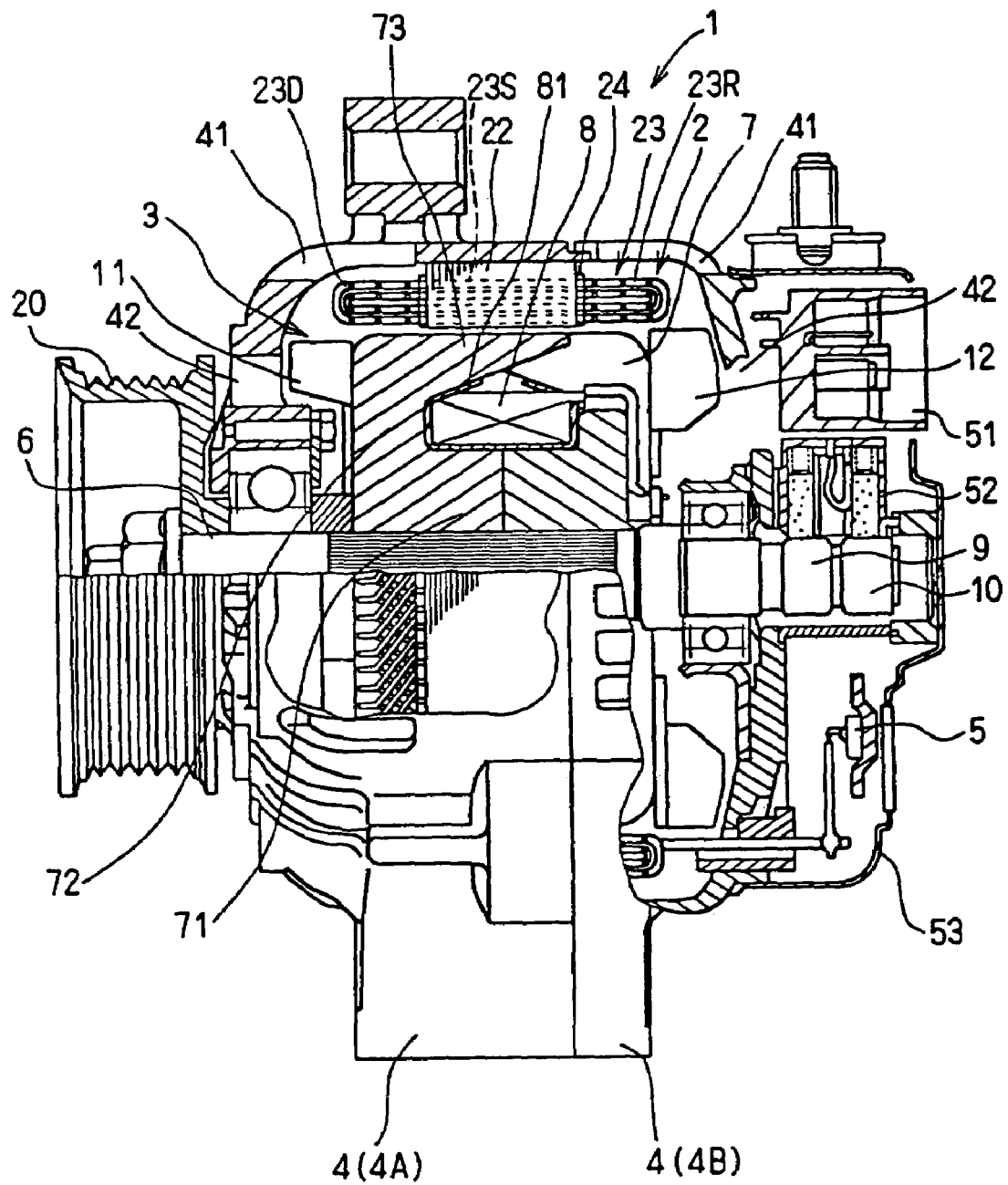
FIG. 1 is a cross sectional view of an alternator according to a first embodiment of the present invention.
Figure 2:
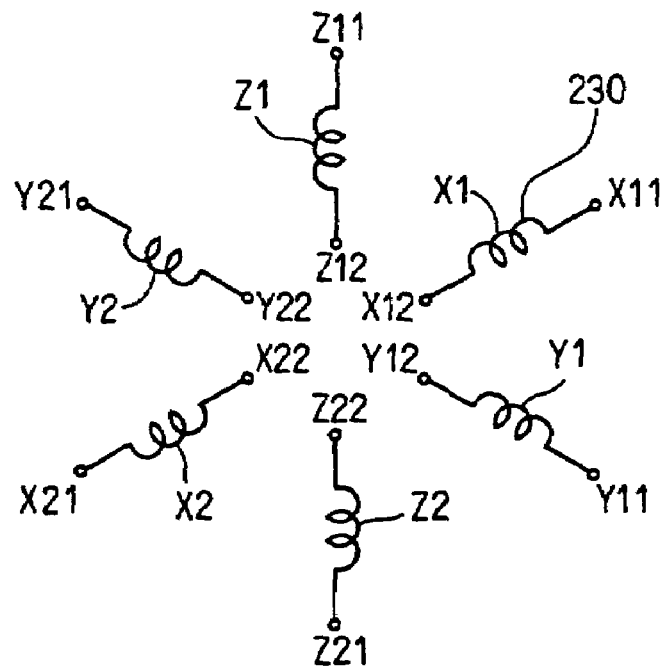
FIG. 2 is a circuit diagram showing electric angles of windings according to the first embodiment of the present invention.
Figure 3:
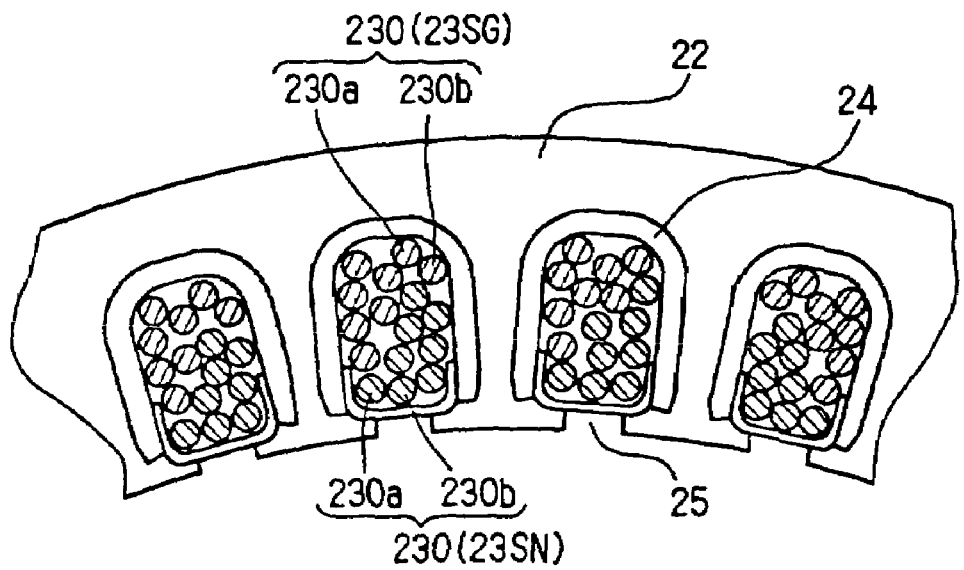
FIG. 3 is a cross-sectional view of a stator showing an arrangement of wires in slots according to the first embodiment of the present invention.

Referring to FIG. 1, the alternator 1 has a stator 2, a rotor 3, a frame 4 and a rectifier 5. The stator 2 is supported and fixed on the frame 4. The stator 2 has a stator core 22, a stator winding 23 and insulators 24 insulating the stator winding 23 from the stator core 22 as shown in FIG. 3. The stator core 22 is made of a laminated thin steel plate. The stator core 22 has a plurality of slots 25 that accommodate a part of the stator winding 23. The stator winding 23 provides drive side coil ends 23D and rear side coil ends 23R.

Figure 10:
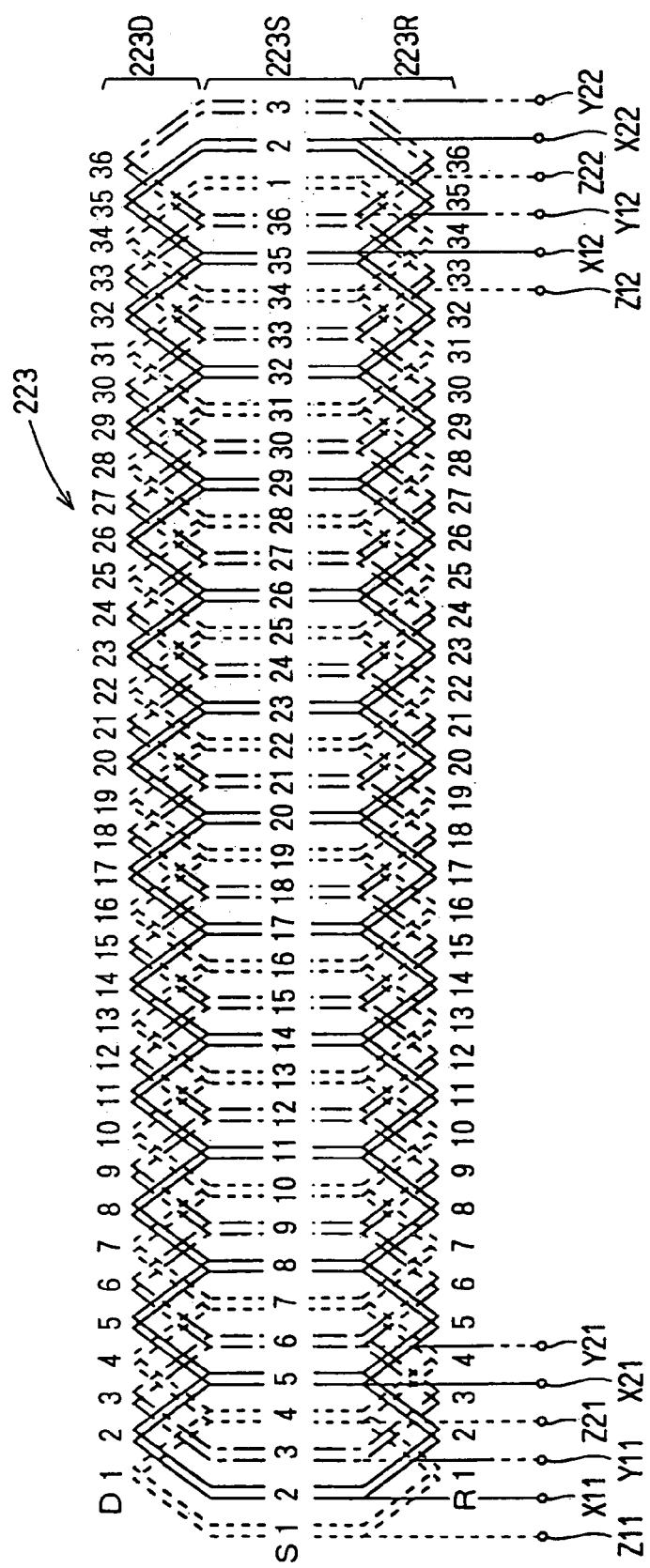
FIG. 10 is a wiring chart of windings on a stator core according to a second embodiment of the present invention.

The stator winding 23 is a three-phase winding that is made of a plurality of conductors 230. Each of the phase windings has a pair of coils provided by conductors 230, respectively. Each of conductors 230 is a continuous wire and is wound to provide an individual coil wound at least one time around the stator core 22. Six conductors 230 provide six coils X1, X2, Y1, Y2, Z1 and Z2 for the three-phase winding. Each of the coils is formed as the wave form winding. The coils X1 and X2 are shifted 180 degrees electric angle for providing an X-phase winding of the three-phase winding. The coil X1 has a beginning lead X11 and an end lead X12. The coils Y1 and Y2, and Z1 and Z2 are arranged in the same manner. The coils X1, X2, Y1, Y2, Z1 and Z2 are connected into the Y-connection as shown in FIG. 10.

In this embodiment, each of the conductors 230 is made of two strands 230a and 230b of wire, that are connected in parallel at both ends. This arrangement makes it easy to insert them into the slot 25 and improve the cross-sectional ratio of the conductors in the slot. Each of the strands is a wire, e.g., copper, that is covered with insulating layer and has 1.3 mm diameter.

Figure 4:
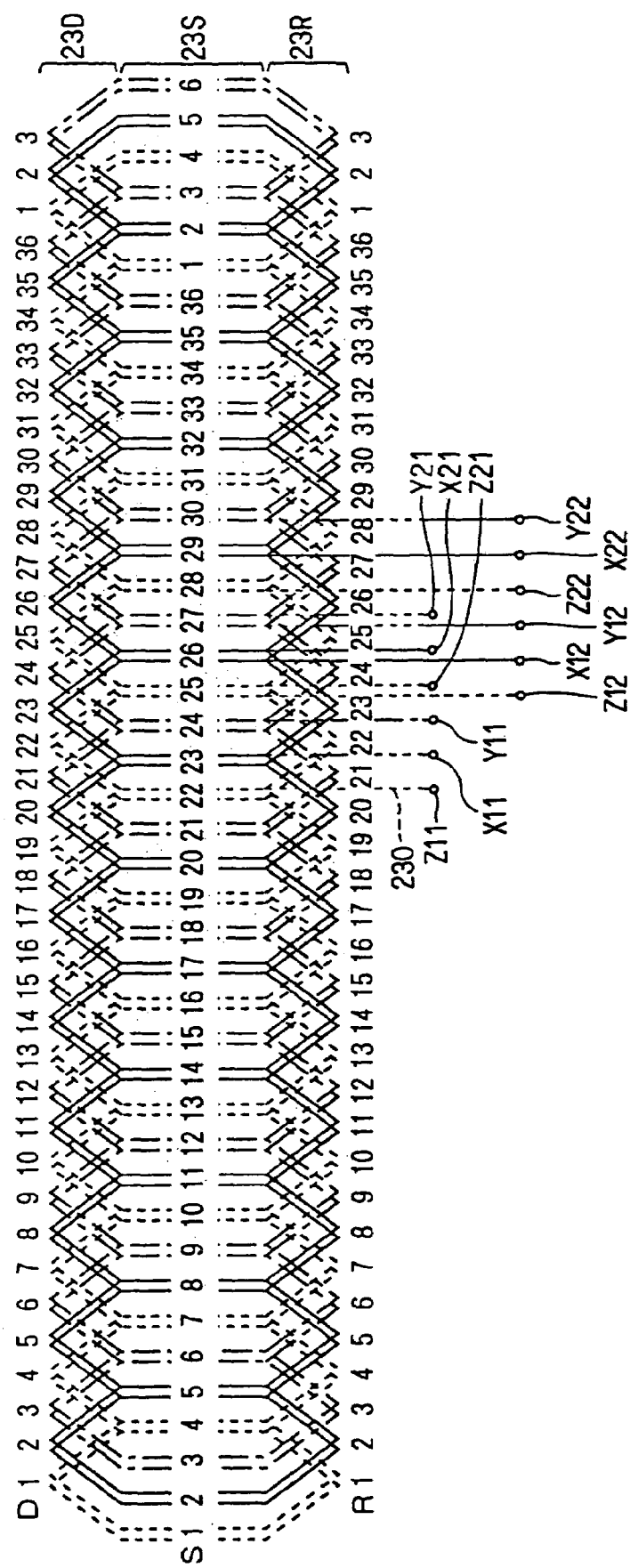
FIG. 4 is a wiring chart of the windings on a stator core according to the first embodiment of the present invention.

Each of the coils X1, Y1, Z1, X2, Y2 and Z2 has in-slot portions 23S, drive side coil ends 23D and rear side coil ends 23R as shown in FIG. 1. FIG. 4 shows portions of the coils X1, Y1, Z1, X2, Y2 and Z2 by indicating each portions with numbers of the slots 25. The in-slot portions 23S indicated by S1–S36 are accommodated in the slots 25. The drive side coil ends 23D indicated by D1–D36 extend toward a drive side on which the pulley 20 is mounted. The rear side coil ends 23R indicated by R1–R36 extends toward a rear side on which the rectifier 5 is mounted. The drive side coil ends 23D and the rear side coil ends 23R connects two of the in-slot portions 23S spaced apart a magnetic pole-pitch. In this embodiment, since each coil is wound four turns on the stator core 22, each coil has four similar shaped in-slot portions, drive side coil ends and rear side coil ends with respect to one slot 25. For example, the coil X1 has four in-slot portions S2 in the second slot 25. The coil X2 has four in-slot portions S2 in the second slot 25. Therefore, each slot 25 contains eight in-slot portions. The coil X1 has four drive side coil ends, two drive side coil ends D2 and two drive side coil ends D35, which are extending from the second slot 25. The coil X1 has four rear side coil ends, two rear side coil ends R2 and two rear side coil ends R35, which are extending from the second slot 25. Similarly, the coil X2 has four drive side coil ends and four rear side coil ends.

Referring to FIG. 3, each of the slots 25 accommodates sixteen strands 230a and 230b providing eight conductors 230. In this embodiment, the conductors 230 in the slot 5 may be divided into two groups, an inner group and an outer group, indicated by different hatching lines in FIG. 3. One of the slots 25 accommodates two coils, e.g., the coils X1 and X2, which are shifted 180 degrees. One of the coils in the slot 25 mainly occupies radially inner area of the slot 25 and forms the inner group. The other one of the coils in the slot 25 mainly occupies radially outer area of the slot 25 and forms the outer group. In this embodiment, each group has eight strands 230a and 230b for providing four conductors 230.

The rotor 3 is rotatable with a shaft 6. The rotor 3 has a Lundel type pole core 7, a field winding 8, slip rings 9 and 10, a mixed flow cooling fan 11 and a centrifugal cooling fan 12. The shaft 6 is rotatably supported by the frame 4 and supports a pulley 20.

The pole core 7 is made of a pair of cores. Each core has a cylindrical boss 71, a disc portion 72 and a plurality of magnetic claw poles 73. The cylindrical boss 71 is fixed on the shaft 6. The disc portion 72 extends radially from an axial end of the boss 71. The magnetic claw poles 73 extend axially from radial outermost portions of the disc portion 72. The cores are assembled to mesh the magnetic claw poles 73.

The field winding 8 is disposed in the pole core 7 and insulated from the cores by insulating paper 81. The insulating paper 81 is an impregnated sheet that covers the field winding 8 and is firmly fixed on the field winding 8 by a heating process.

The fan 11 is mounted on a front end of the pole core 7 by welding or the like. Likewise, the fan 12 is mounted on a rear end of the pole core 7. A projected area, projected in a rotating direction, of each blade of the fan 11 is smaller than that of the fan 12.

The frame 4 accommodates and supports the stator 2 and the rotor 3. The frame 4 has a front frame 4A and a rear frame 4B joined firmly each other by a plurality of through-bolts (not shown). The frame 4 has a plurality of windows 41 as air inlets and air outlets. The windows 41 located on a radial outside wall of the frame 4 in two rows work as the air outlet. The windows 42 located on both axial ends of the frame 4 work as the air inlets. Therefore, cooling wind flows on a surface of coil end portions of the stator winding 23.

Electric circuit members including the rectifier 5, a regulator 51 and a brush assembly 52 are mounted on a rear end of the rear frame 4B. The electric circuit members are protected by a cover, 53. The rectifier 5 is connected with a plurality of leads extending from the stator winding 23.

When the engine rotates the pulley 20, field current is supplied to the field winding 8. The rotor 3 rotates and generates rotating magnetic field to induce an AC current on the stator winding 23. The induced power is rectified and supplied as a DC power through the output terminal of the rectifier 5. The fans 11 and 12 generate cooling wind from the inlets 42 to the outlets 41.

Figure 5:
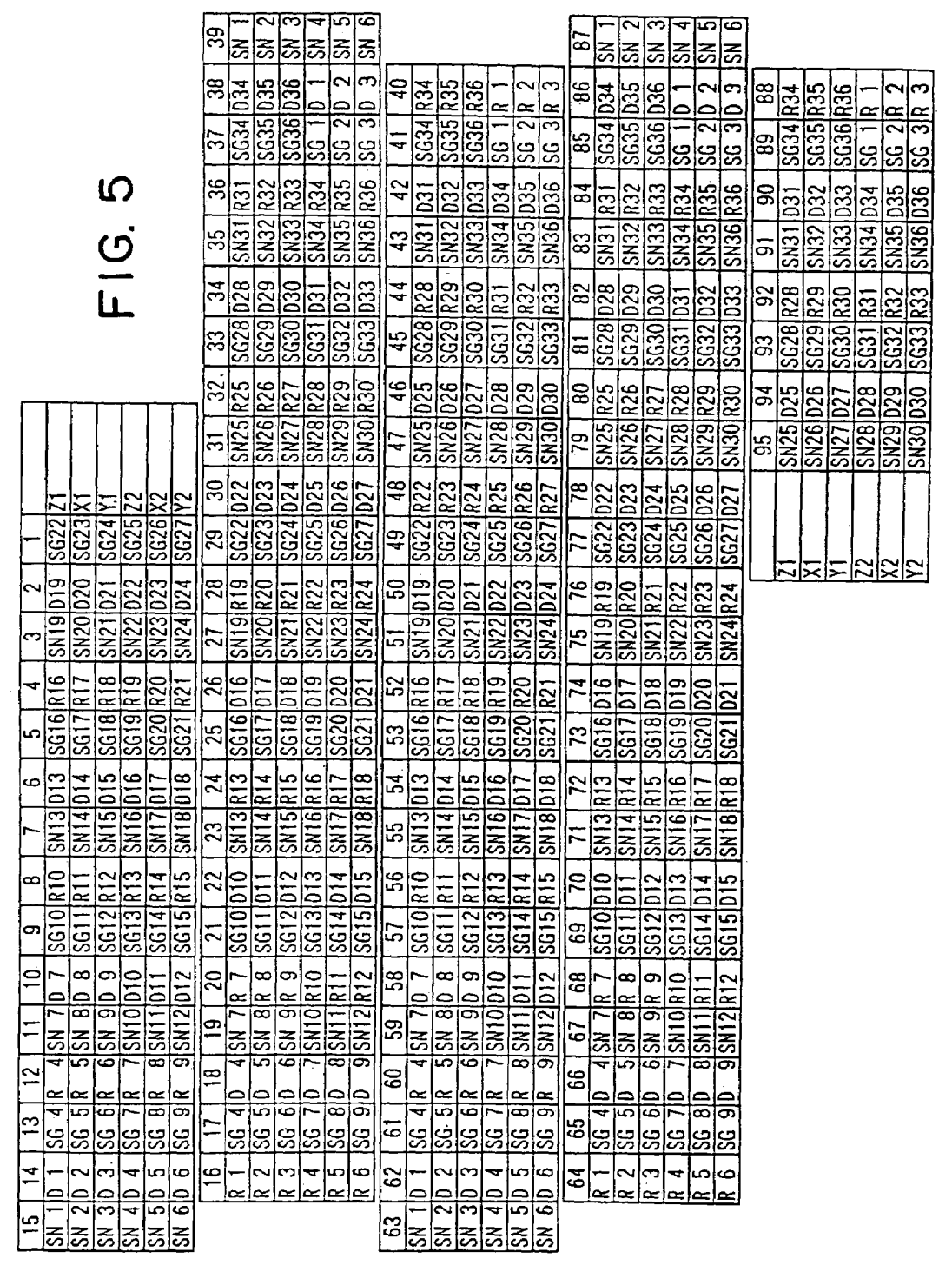
Figure 6:
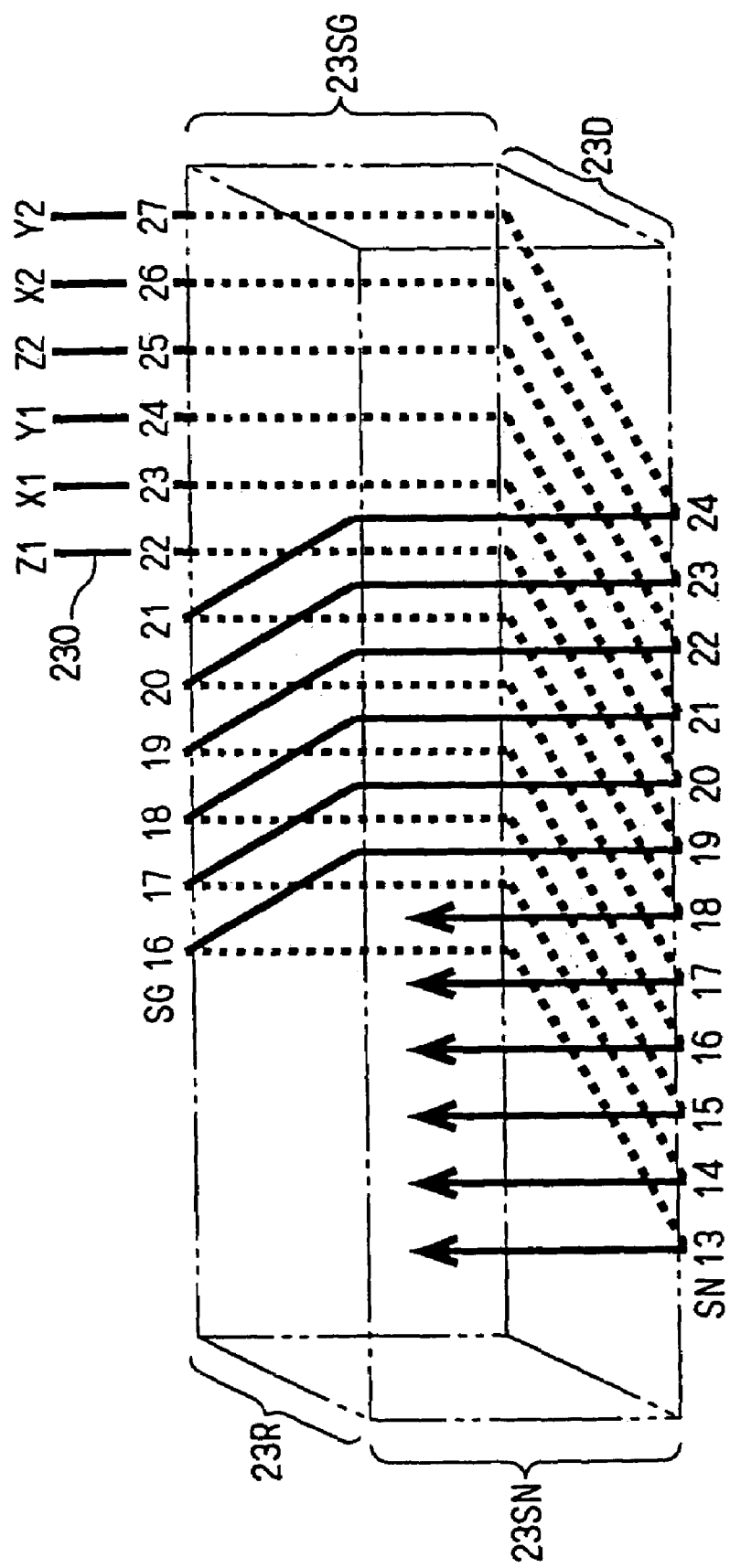
FIG. 6 is a perspective view of the windings showing a winding process according to the first embodiment of the present invention.
Figure 7:
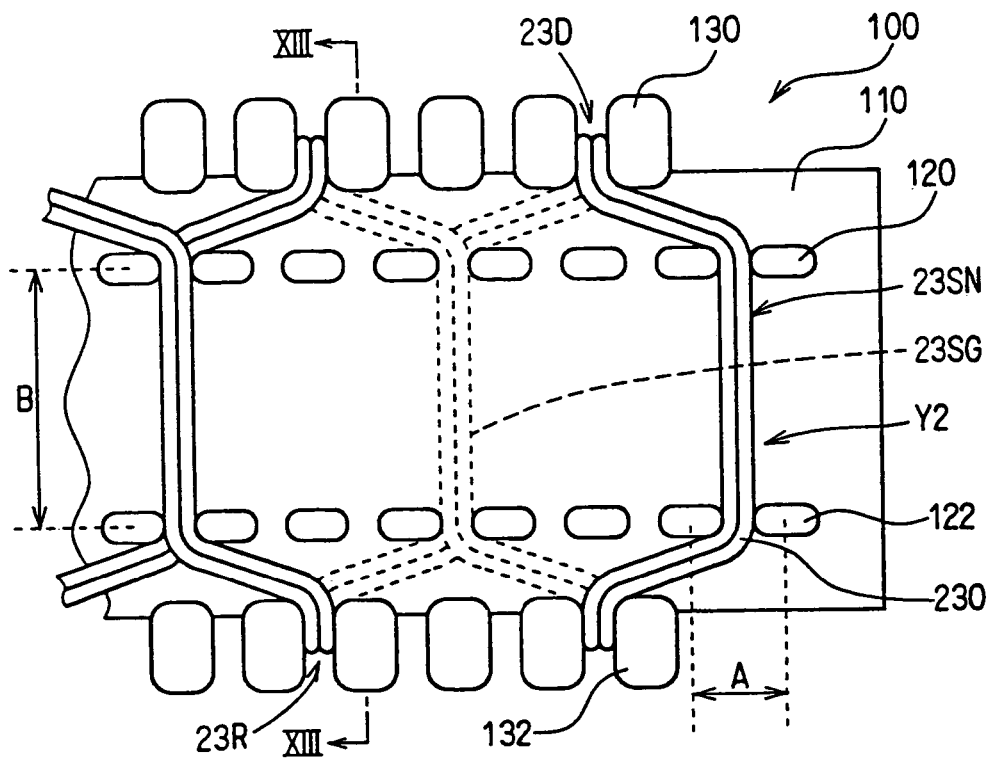
FIG. 7 is a plan view of a winding tool according to the first embodiment of the present invention.
Figure 8:
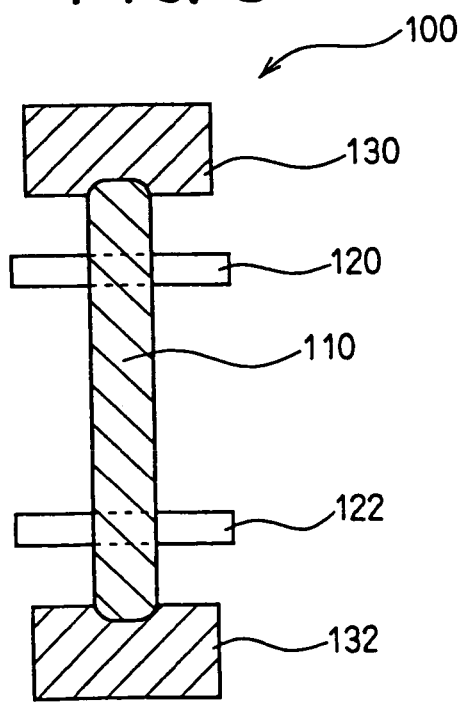
FIG. 8 is a cross-sectional view of the winding tool showing XIII—XIII cross section in FIG. 7 according to the first embodiment of the present invention.
Figure 9:
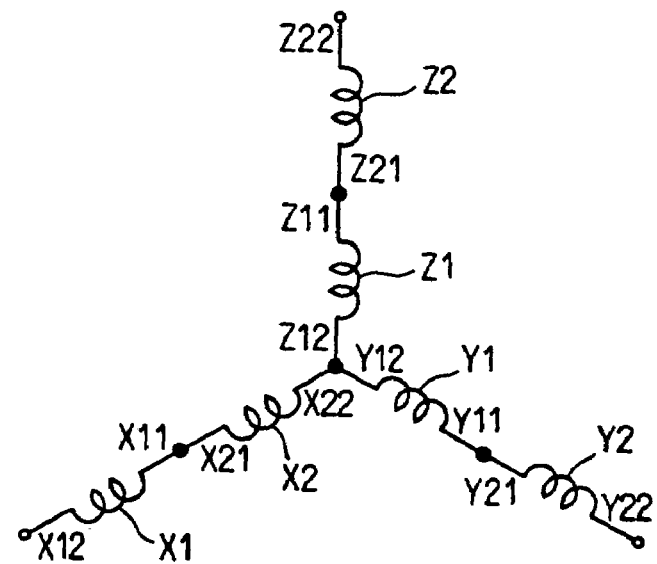
FIG. 9 is a circuit diagram of the windings according to the first embodiment of the present invention.

The stator winding 23 described above can be manufactured by using a process that will be described with reference to FIGS. 5 through 8. FIG. 5 is a chart showing a winding process of the stator winding 23. FIG. 6 schematically shows beginning six steps of the winding process using an imaginary square pillar imitating a tool shown in FIGS. 7 and 8. FIGS. 7 and 8 show an embodiment of the tool utilized in the winding process.

The in-slot portions 23S are indicated by the initial letters S, SN or SG and a number of the slot. For example, the in-slot portion 23S in the first slot is indicated as S, SN1 or SG1. The in-slot portion in the inner layer is called an inner in-slot portion and indicated as SN1. The in-slot portion in the outer layer is called as an outer in-slot portion and indicated as SG1. Likewise, the drive and rear side coil ends 23D and 23R are indicated by the initial letters and a number of the slot. For example, the drive and rear side coil ends 23D and 23R between the first slot and fourth slot are indicated as D1 and R1.

The manufacturing process has a winding process, a curving process, and a mounting process.

In the winding process, a belt-shaped coil is formed by winding six conductors 230 simultaneously on the tool as shown in FIGS. 6, 7 and 8. The winding process starts from an intermediate portion, a beginning portion, corresponding to the 22nd through 27th slot, and proceeds in accordance with an order indicated in FIG. 5. The coils X1, Y1, Z2, X2 Y2 and Z2 are wound simultaneously on the tool in accordance with the order indicated in FIG. 5. For example, the conductor 230 of the coil Z1 is wound on the tool to form portions SG22, D19, SN19, R16 - - - SG28, D25 and SN25 in an orderly manner.

In a first step, the conductors 230 are placed on a first side of the tool to provide the outer in-slot portions SG22 through SG27 and leads extending beyond the rear side coil end 23R. The conductors 230 are shifted three slots distance during providing the drive side coil ends 23D in a second step. Then, in a third step, the conductors 230 are placed on a second side of the tool that is opposite to the first side to provide the inner in-slot portions SN19 through SN24. In the third step, the conductor 230 for the coil Z2 started from the 25th slot is placed on the second side of the tool to provide the inner in-slot portion SN22. The conductors 230 are shifted three slots distance during providing the rear side coil ends 23R.

When the winding process reaches the first through sixth slots in the 15th step, a shifting direction is reversed from descending to ascending order. The conductors are wound over the conductors previously wound. Therefore, the conductors are wound one over another. Then, when the conductor 230 for the coil Z2 reaches to the 22nd slot again at the 27th step, the conductor 230 is placed on the second side of the tool again to provide the inner in-slot portion SN22. When the conductor 230 for the coil Z1 returns to the 22nd slot in the 29th step, the conductor 230 is placed on the first side of the tool again to provide the outer in-slot portion SG22.

The winding process proceeds to the other end and reverses again in the 40th step. One winding cycle is completed in the 48th step. In this embodiment, to provide sufficient turns, a further winding cycle proceeds from the 49th step to the 95th step.

In the winding process, the conductors 230 are wound on the tool 100 as shown in FIGS. 7 and 8. The tool 100 has a main body 110, in-slot portion holders 120 and 122, and coil end holders 130 and 132. The main body is a plate having a predetermined width and curved edges to provide an appropriate curvature on the coil end. The in-slot portion holders 120 and 122 are disposed on both sides of the tool 100 for determining the in-slot portions 23SG and 23SN. A distance A is similar to a pitch of the slots 25. A distance B is similar to or longer than an axial length of the stator core 22. The in-slot portion holders and the coil end holders 120, 122, 130 and 132 are attached on the main body 110 as removable parts to draw the main body 110 out from inside the coils. FIG. 7 shows the coil Y2 on rightmost portion of the tool 100.

As a result, the belt-shaped coil is formed, which includes stacking the conductors 230 by spirally winding the conductors 230. The conductors 230 are regularly arranged in the in-slot portions and the coil end portions.

The stator winding 23 has regular in-slot portions and irregular in-slot portions. The regular in-slot portion is connected with not only another in-slot portion disposed in another slot 25 via the coil end, but also another in-slot portion disposed in another slot 25 in an opposite direction via the coil end. For instance, one of the in-slot portions S22 in the 22nd slot 25 is connected with one of the in-slot portions S19 via the drive side coil end D19 and is connected with one of the in-slot portions S25 via the rear side coil end R22. Also another one of the in-slot portions S22 in another layer is connected with one of the in-slot portions S25 via the drive side coil end D22 and is connected with one of the in-slot portions S19 via the rear side coil end R19. Therefore, the regular in-slot portion is connected with two other in-slot portions disposed in different slots located on both sides.

The stator winding 23 also has irregular in-slot portions disposed in six slots 25 located on both ends of the belt-shaped coil. The irregular in-slot portion is connected with two in-slot portions disposed in another slot 25 via the coil ends. For instance, one of the in-slot portions S1 in the first slot 25, which was placed on a leftmost position in the winding process, is connected with one of the in-slot portions S4 via the drive side coil end D1 and is connected with one of the in-slot portions S4 via the rear side coil end R1. Therefore, the irregular in-slot portion is connected with two other in-slot portions disposed in the same slots located on the same circumferential direction.

In this embodiment, the seventh to 36th slots 25 are considered as regular slots which only accommodates the regular in-slot portions. The first to sixth slots 25 are considered as irregular slots which accommodates at least one of the irregular in-slot portions. The irregular slots 25 also accommodate the regular in-slot portions. For instance, the first slot 25 accommodates four regular in-slot portions and four irregular in-slot portions. In the winding process, two of the irregular in-slot portions are placed in the left first slot position, left most position, as shown in FIG. 4. Remaining two of the irregular in-slot portions and four regular in-slot portions are placed in the right first slot position. These two and six in-slot portions are stacked and inserted into the slots 25 in the following processes.

In the winding process, the tool may rotate and shift along feeding nozzle of the conductors 230 for winding the coils. However, the feeding nozzle of the conductors 230 may rotate and shift along the tool.

In the curving step, the belt-shaped coil is curved into a ring and joined by overlapping predetermined length at the left and right some slots to form a ring. In this embodiment, the belt-shaped coil is overlapped at the irregular slots, first to sixth.

The stator winding 23, ring-shaped coil, does not have any conductors that cross over the region between 36th slot and seventh slot, because the belt-shaped coil only has the irregular in-slot portions on the leftmost three slots region and the rightmost three slots region. Therefore, the irregular slots, the first through sixth slots, accommodate the irregular in-slot portions that have two different connections. First irregular in-slot portions are connected with the other two in-slot portions accommodated in the other slot located on a circumferential clockwise direction. The other second irregular in-slot portions are connected with the other two in-slot portions accommodated in the other slot located on a circumferential counter clockwise direction. The irregular slots provide a discontinuity of the coils along a circumferential direction, since there is no conductor cross over a region where the irregular slots are located. The regular slots provide a continuity of the coils, since the regular slots accommodates only the regular in-slot portion that connects two in-slot portions accommodated in the two other slots, respectively.

Then, the ring-shaped coil is mounted on the stator core 22 by inserting the in-slot portions 23S into the slots 25 from inside opening thereof. The conductors are wound on a tool so that the conductors are orderly stacked according to the slots to form the belt-shaped coil, but the belt-shaped coil is mounted on the stator core by inserting the orderly stacked conductors into the slots in a disorderly fashion. The coils are connected into the Y-connection as shown in FIG. 10. The leads X1, X12, Y11, Y12, Z11, Z12, X21, X22, Y21, Y22, Z21 and Z22 extends beyond the coil ends and are located on a region where the regular slots are located. A number of the irregular slots corresponds to a number of windings.

According to the embodiment, it is possible to decrease a collision between the coil ends and to avoid a complex shape. It is possible to increase the ratio of the conductors in the slot. It is possible to decrease resistance of the stator winding by decreasing heights of the coil end. It is possible to improve cooling performance of the stator winding 23 by reducing flow resistance of the coil ends. Further, it is possible to improve a productivity by decreasing joining portions relative to the alternator utilizing a plurality of short length segment conductors and by using a improved winding process of the belt-shaped winding.

Second Embodiment

FIG. 10 shows a second embodiment of the present invention. In this embodiment, the stator winding 223 is provided by a plurality of lap-windings. Referring to FIGS. 10 and 11, the winding process begins from left and ends at right. In the winding process, the conductors 230 are wound on the tool in accordance with the order indicated in FIG. 11. For instance, the conductor 230 for the coil Z1 is placed on the inner in-slot portions SN1, the drive side coil ends D1, the outer in-slot portions SG4 and the rear side coil ends R1, during the first step to the 15th step. Therefore, the coil Z1 has four turn coils between the first to fourth slots. Then the conductor 230 is shifted three slots in the 16th step.

Figure 12:
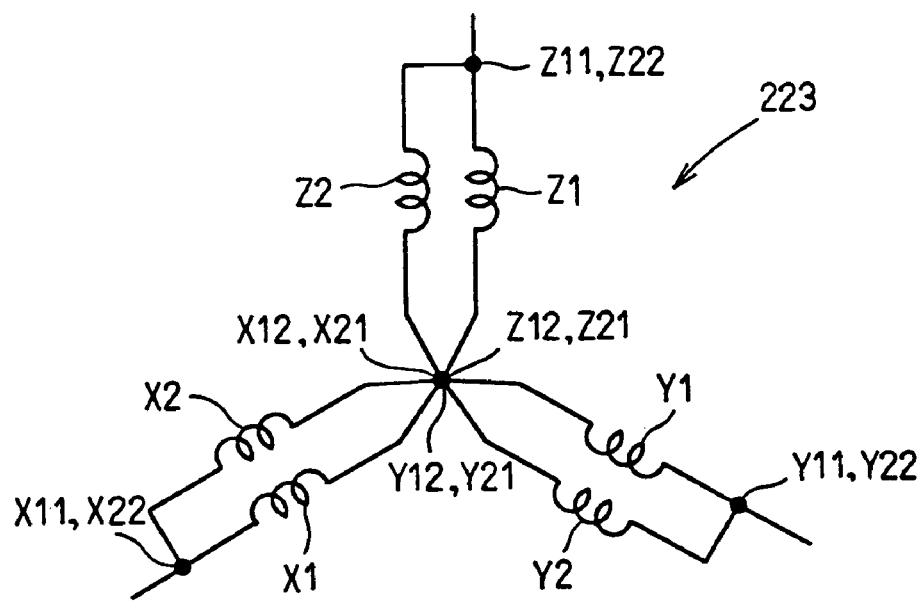
FIG. 12 is a circuit diagram of the windings according to the second first embodiment of the present invention.

As a result, a belt-shaped coil is provided. The belt-shaped coil is curved and joined by overlapping at the left and right three slots. The coils X1, Y1, Z1, X2, Y2 and Z2 are connected into the Y-connection as shown in FIG. 12. In this embodiment, the coils X1 and X2 are connected in parallel to avoid laying the leads along the stator for connection, since a beginning of the first coil and an end of the second coil are placed on the same position as shown in FIG. 10. For example, the beginning Z11 and the end Z22 are disposed on the first slot.

The lap-winding is made of at least two of in-slot portions in one of the slot, at least two of in-slot portions in another of the slot which is spaced a magnetic pole pitch apart from the one of the slot and coil ends connecting them. For instance, the lap-winding coil Z1 has at least two in-slot portions S1, at least two in-slot portions S4, two of the drive side coil ends D1 and one of the rear side coil end R1.

In this embodiment, almost all of the in-slot portions are connected with the other two in-slot portions accommodated in another slot. However, the stator 2 still has regular slots and irregular slots. The regular slots, from the fourth to 36th slots, accommodate not only the in-slot portions that are connected with other two in-slot portions accommodated in another one of the slots, but also the in-slot portions that are connected with other two in-slot portions accommodated in other two in-slot portions located on both circumferential sides. The irregular slots, from the first to third slots, accommodate only the in-slot portions that are connected with other two in-slot portions accommodated in another one of the slots. The stator 2 only has the first, second and third slots as three irregular slots that only accommodate the irregular in-slot portions. The leads X1, X12, Y11, Y12, Z11, Z12, X21, X22, Y21, Y22, Z21 and Z22 extends beyond the coil ends and are located on a region where the irregular slots are located. A number of the irregular slots corresponds to a number of phases of poly-phase winding.

Therefore, the irregular slots, the first, second and third slots, accommodate the irregular in-slot portions that have two different connections. First irregular in-slot portions are connected with the other two in-slot portions accommodated in another layer of the other slot located on a circumferential clockwise direction. The other second irregular in-slot portions are connected with the other two in-slot portions accommodated in another layer of the other slot located on a circumferential counter clockwise direction. The irregular slots provide a discontinuity of the coils along a circumferential direction, since there is no conductor cross over a region where the irregular slots are located. The regular slots provide a continuity of the coils, since the regular slots accommodate at least one of the regular in-slot portion that is connected with two in-slot portions accommodated in another layer of two other slots, respectively.

In this embodiment, it is possible to achieve the same advantage of the first embodiment. Further, the drive side coil ends 223D are inclined uniformly. The rear side coil ends 223R are also inclined uniformly. Therefore, it is possible to avoid a collision between coil ends.

Other Embodiments

The inner layer and outer layer of the conductors 230 in the slot 25 may be arranged into a single mixed layer during the mounting process. The conductor 230 may be a single wire or a bundle of three or more wires. The conductor 230 may be provided by a rectangular cross-sectional wire. In this arrangement, it is possible to increase the ratio of the conductor in the slot by arranging the conductors regularly in the slot. Further, the coils may have different turns. For example, the coil Y2 may finish the winding process in the 83rd step. Further, the pair of the coil, e.g., the coil X1 and X2, may be provided by a single continuous wire by utilizing a continuous wire bent at their joining portion. For example, the coil X1 and X2 may be provided by a wire that has a bent portion at a place corresponding to the terminal X11 and X21.

Figure 14:
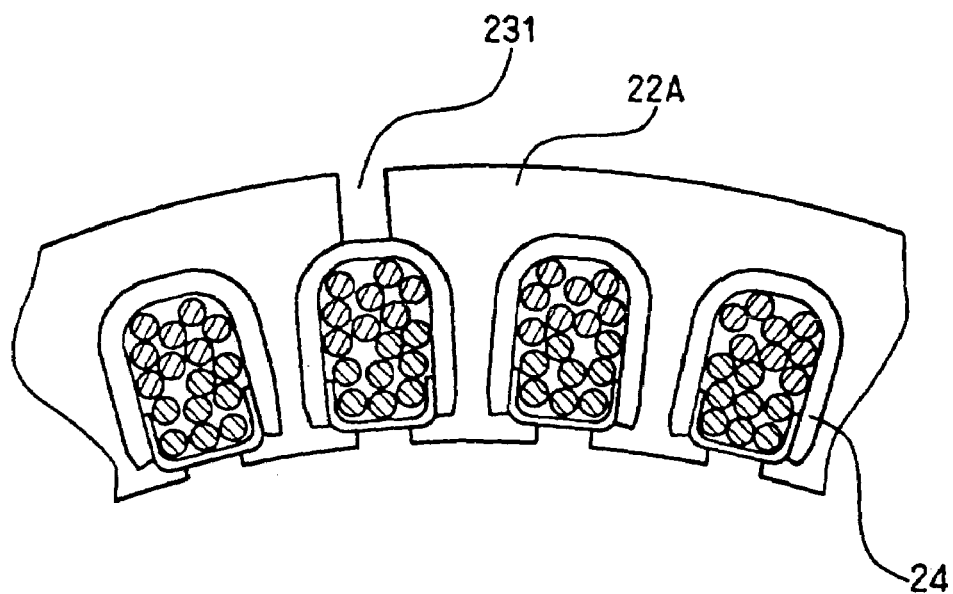
FIG. 14 is a cross-sectional view of a stator according to the third embodiment of the present invention.
Figure 13:
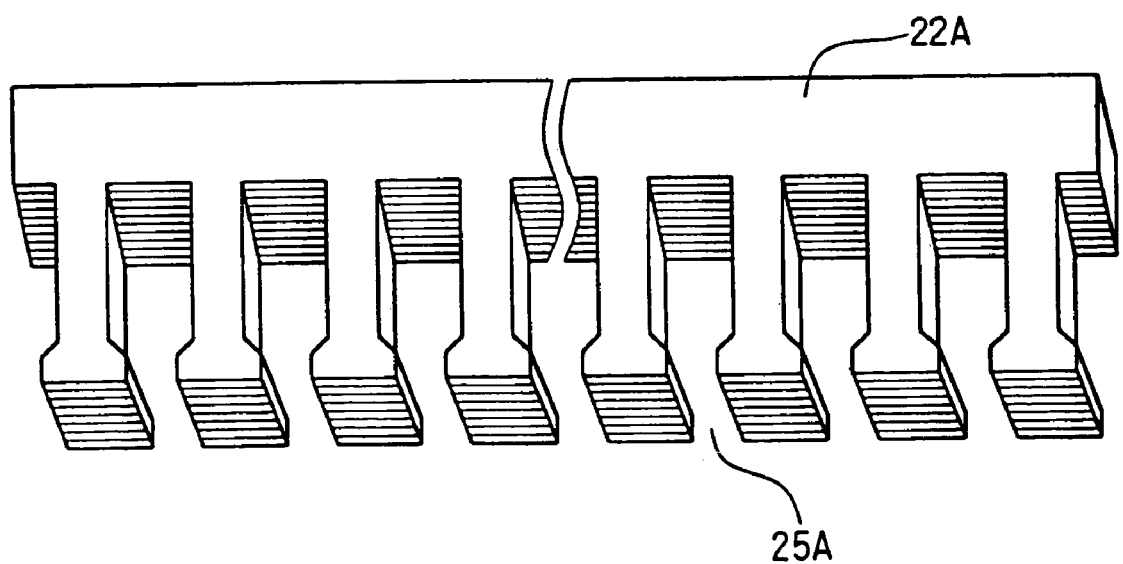
FIG. 13 is a perspective view of a stator core according to a third embodiment of the present invention.
Figure 15:
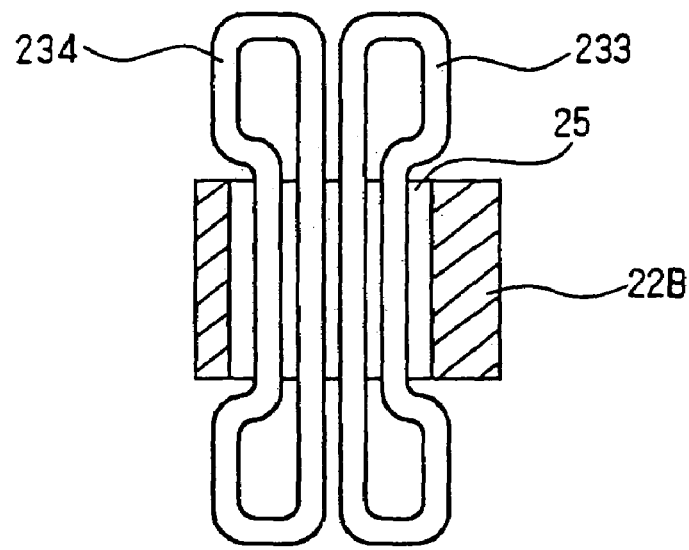
FIG. 15 is a cross-sectional view of a stator according to a fourth embodiment of the present invention.

The stator core may be curved after mounting the belt-shaped winding. For example, the belt-shaped winding may be mounted on a straight stator core 22A with a plurality of slots 25A as shown in FIG. 13. Then the straight stator core 22A is curved into a C shape or a ring as shown in FIG. 14. In this embodiment, the stator core 22A has a slit 231 as a connecting portion axially extending over an axial length.

Figure 16:
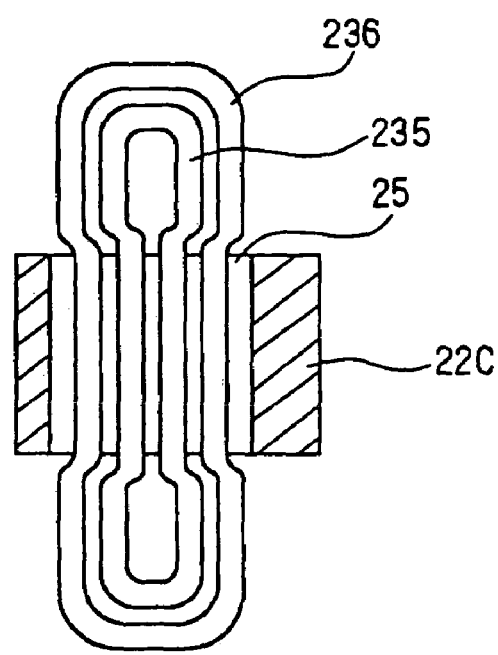
FIG. 16 is a cross-sectional view of a stator according to a fifth embodiment of the present invention.

Further, the stator winding may have a plurality of poly-phase windings. For example, a stator core 22B may carry a first poly-phase winding 233 and a second poly-phase winding 234. The first poly-phase winding 233 and the second poly-phase winding 234 may be orderly stacked in the slots 25. These poly-phase windings 233 and 234 may be utilized to supply multi-voltage outputs. Further, the poly-phase windings may be arranged in a surrounding manner as shown in FIG. 16. In this embodiment, a second poly-phase winding 236 is wound on a first poly-phase winding 235 to surround the coil ends of the first poly-phase winding 235.

Furthermore, the stator winding may have two sets of three phase windings that are shifted 30 degrees. This arrangement may be considered as a six-phase winding. Therefore, the stator winding may be manufactured by winding 12 conductors on a winding tool in a winding process.

The present invention can be applied to a generator, a motor or a rotary electric machine that selectively acts as a generator and a motor.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention.

What is claimed is:

1. A method for manufacturing a rotary electric machine, the rotary electric machine having a stator core with a plurality of slots and a poly-phase stator winding accommodated in the slots, each phase winding of the poly-phase stator winding having a plurality of coils, the method comprising the following consecutive steps:

winding conductors on a tool to form a belt-shaped coil comprising the poly-phase stator winding;

drawing the tool out from the belt-shaped coil;

curving the belt-shaped coil into a ring; and mounting the belt-shaped coil on the stator core by inserting the conductors into the slots in a manner that electrical phases of the plurality of coils forming each phase winding differ by in 180 degrees.

2. The method for manufacturing a rotary electric machine according to claim 1, wherein the stator core is a ring, and the belt-shaped coil is curved into a ring-shaped coil before inserting the conductors into the slots.

3. The method for manufacturing a rotary electric machine according to claim 1, wherein the belt-shaped coil is curved into a ring with the stator core after inserting the conductors into the slots.

4. The method for manufacturing a rotary electric machine according to claim 1, wherein the conductors are wound one over another.

5. The method for manufacturing a rotary electric machine according to claim 1, wherein the conductors are wound on a tool so that the conductors are orderly stacked according to the slots to form the belt-shaped coil, and the belt-shaped coil is mounted on the stator core by inserting the conductors into the slots in a disorderly fashion.

6. A method for manufacturing a rotary electric machine, comprising the following consecutive steps:

winding a poly-phase stator winding around a tool to form a coil arrangement that has a belt shape so that the coil arrangement has a first end and a second end in an axial direction of the tool, each phase winding of the poly-phase stator winding having a plurality of coils that are continuous wires;

removing the tool from the coil arrangement;

curving the coil arrangement into a ring so that the first end and the second end of the coil arrangement are overlapped with each other to have a discontinuous portion of the coil arrangement;

providing a rotor;

providing a stator having a stator core with a plurality of slots that have a plurality of regular slots located side by side and a plurality of irregular slots located side by side; and inserting the coil arrangement into the slots of the stator core so that the discontinuous portion of the coil arrangement is inserted into the irregular slots and a remaining portion of the coil arrangement is inserted into the regular slots, wherein the coils are located on the stator core in a manner that the electrical phase difference of the coils of each phase winding is 180 degrees.

7. The method according to claim 6, wherein each of the continuous wires has a plurality of in-slot portions and coil end portions, and the coil arrangement is inserted into the slots so that the in-slot portions of the continuous wires are disposed inside the slots and the coil end portions of the continuous wires are disposed outside the slots.

8. The method according to claim 6, further comprising: providing a frame to support the rotor and the stator.

9. The method according to claim 6, further comprising: providing a rectifier that rectifies induced output from the poly-phase stator winding.

* * * * *